T857007

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 42

620,292

MODIFYING POLYMERS WITH CYANOGEN AZIDE

David S. Breslow, Wilmington, Del., assignor to Hercules Incorporated, Wilmington, Del., a corporation of Delaware

Filed Mar. 3, 1967. Published Dec. 3, 1968

Class 260—75

No Drawing. 8 Pages Specification

Hydrocarbon polymers such as polyolefins, polystyrene, natural rubber, etc. and polyesters of dicarboxylic acids with glycols such as poly(ethylene terephthalate), etc. can be cross-linked or otherwise modified with small amounts of cyanogen azide. When modified by treating with small amounts of cyanogen azide, the products have increased susceptibility toward the application of dyes, coatings, adhesives, as well as improved printability, emulsifiability and antistatic properties while retaining their solubility. The cross-linked products obtained by using slightly larger amounts of cyanogen azide are in addition tough, resilient, and insoluble in solvents for the untreated polymer.

Cyanogen azide is an unstable liquid having the formula $N_3CN$ and is best used dissolved in a solvent.

In preparing the modified polymers the cyanogen azide is incorporated in the polymer as for example by dissolving in a mutual solvent and then evaporating the solvent. The polymer plus the cross-linker is then subjected to either heat or irradiation. In general from about 0.1% to about 10% of cyanogen azide will be used. If modification is to be accomplished by heating, a temperature of 20° C. to 150° C. will be used. If irradiation is used, the wave lengths will be in the range of from about 2000A to 3000A.